May 4, 1948. H. J. LISS 2,440,864
REPAIR CLAMP FOR PIPE JOINTS
Filed July 2, 1947
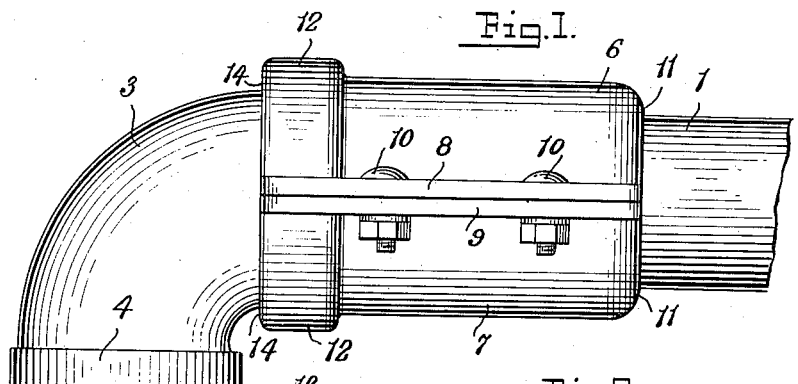
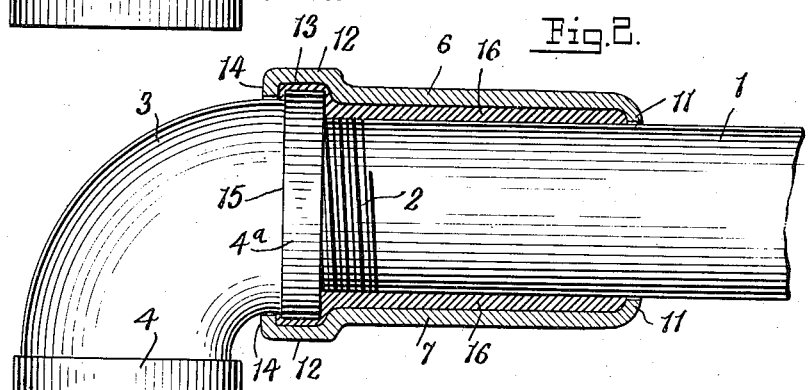
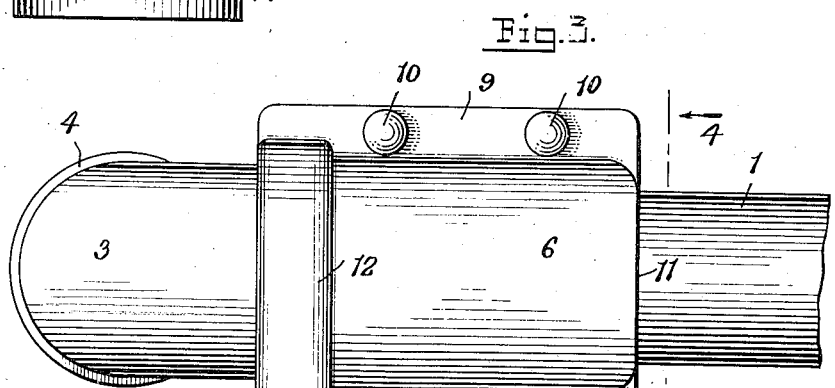
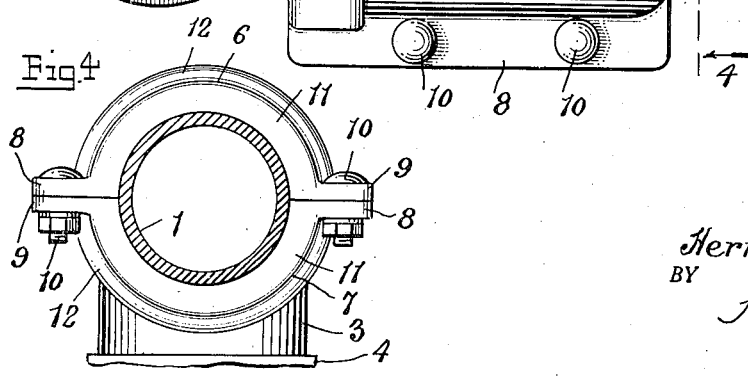
INVENTOR.
Herman J. Liss
BY
Harry Radzinsky
Attorney Patented May 4, 1948

2,440,864

UNITED STATES PATENT OFFICE 2,440,864

REPAIR CLAMP FOR PIPE JOINTS

Herman J. Liss, Brooklyn, N. Y.

Application July 2, 1947, Serial No. 758,523

7 Claims. (Cl. 285—99)

This invention relates to clamps adapted for use in repairing leaks or weaknesses in the joints of piping such as used for water supply, plumbing or the like, and has for its primary object, the provision of an article of this character which will materially strengthen the joint in the pipe; which will hold the parts of the pipe against longitudinal separation, and which will effectively seal a leak at or adjacent to the joint.

In piping employed for water supply, for plumbing and other purposes, many leaks occur at points where a fitting, such as an elbow, T-fitting, nipple or the like is threadably joined to a length of piping, and while such leaks can be permanently repaired by the replacement of a length of pipe or new fitting, the services of a plumber are not always available, and in addition, the parts required for replacement are often not immediately procurable. The result is that considerable damage often occurs before the leak can be repaired.

One of the objects therefore, of the present invention is to provide a clamp which is adapted to be fitted about a pipe at its junction with or connection to, a fitting, such as to an elbow, T, or the like, and which will act to seal a leak at said junction; which will grip the pipe and fitting in such a manner as to materially strengthen the piping at this joint, and which will hold the pipe and fitting firmly against longitudinal shift or separation.

Another object of the invention is to provide a repair clamp of this character which can be fitted in place by a person inexperienced in the use of tools and with simple tools, or one which may be fitted by plumbers or workmen for temporary repair purposes pending the making of final repairs or parts replacement, and which will satisfactorily retain the parts in non-leaking, operative condition.

These and other objects are attained by the invention, a more particular description of which will hereinafter appear and be set forth in the claims appended hereto.

In the accompanying drawing, wherein an illustrative embodiment of the invention is disclosed, Fig. 1 is a side elevation of the improved repair clamp, showing the same fitted in position over a joint between a pipe and an elbow fitting; Fig. 2 is a longitudinal sectional view through the clamp fitted in place on the pipe and fitting; Fig. 3 is a top plan view of the clamp as applied to a pipe and fitting, and Fig. 4 is a sectional view, taken on the line 4—4 of Fig. 3, looking in the direction of the arrows.

Referring to the drawing, 1 indicates a portion of a section of pipe such as used in plumbing or for the conveyance of liquids. The pipe 1 is provided with the conventionally threaded end portion 2, on which is threadably received a fitting 3, the same in this instance being an elbow, although it might be a T-fitting, a coupling nipple, or any other of the many known fittings used in plumbing. Such fittings are all provided with the end flanges 4 and 4a. The joint just described is a common one and well known in this art. Leaks in piping most generally occur at these joints, namely, where the threaded end of a length of pipe is received in a fitting, and the present invention has reference to a repair clamp which will not only serve to stop the leak at this point, but which will also reinforce the piping thereat and hold the parts thereof against longitudinal separation.

The clamp for this purpose is shown as consisting of the two semi-circular or arcuate halves 6 and 7 which are clamped about the piping, and particularly around the joint therein, in a manner to be described. The two halves of the clamp are similar in all respects, each being provided with a pair of laterally extending side flanges 8 and 9, which, when the two halves of the clamp are placed about the joint in the manner illustrated in the drawing, rest against the similar flanges on the companion half of the clamp, and the overlying flanges 8 and 9 are then secured together by means of the bolts 10 extending through them. Each of the halves 6 and 7 of the clamp is provided at one end with an inturned flange 11, and these inturned flanges 11 constitute gripping jaws which, when the clamp is tightened about the pipe 1, grip the pipe firmly.

At their opposite ends, each half 6 and 7 of the clamp is formed with an arcuate enlargement 12, these enlargements having an inside channel 13, which, when the two halves are clamped around the pipe, constitutes an annular groove embracing the annular flange 4a on the fitting 3. It will be noted that an inturned flange 14 is provided at one end of each half of the fitting, these flanges cooperating in the formation of a relatively continuous annular inturned flange engaging against the edge 15 of the flange 4a of the fitting 1. Since the pipe 1 is firmly gripped at one end of the clamp by the flanges 11, and the edge 15 of the fitting flange 4a is engaged by the inturned flanges 14, it will be clear that the two parts of the joint, namely, the pipe 1 and fitting 3, are held against longitudinal separation, should there be a weakness at their joint.

Moreover, the embracing of the two parts by the clamp will materially stiffen the joint and aid in maintaining the same from tending to buckle at this point.

Provided on the inside of the clamp is a suitable packed material 16, which can be sheet material such as rubber or its equivalent, or it might be a plastic or semiplastic or fibrous material, numerous types of packing material being commercially available for the purpose. The packing, placed between the two halves of the clamp is compressed around the pipe, the joint and the flange of the fitting and is held against longitudinal displacement by being confined between the flanges 11 and 14 as clearly seen in Fig. 2.

Since the clamp is readily fitted on a pipe joint by being merely placed around the same and the bolts 10 then placed in position and tightened, it will be apparent that it may be fitted in place by the inexperienced and will not only effectively seal a leak at any joint between the pipe and an attached fitting, but it will tend to very materially stiffen the joint and in addition prevent longitudinal separation of the parts of the joint. The clamp can be used for either temporary or permanent repair; it can be used as a temporary repair awaiting replacement parts, or it can be used by plumbers for temporarily sealing pipe joints awaiting permanent installations, and it has a host of other uses.

Having described one embodiment of the invention, it is obvious that the same is not to be restricted thereto, but is broad enough to cover all structures coming within the scope of the annexed claims.

What I claim is:

1. A repair clamp of the character described adapted to be fitted over a pipe and a flanged fitting threaded thereon, said clamp consisting of a pair of cooperating arcuate halves clamped about the pipe and about the flange of the fitting, means for holding the halves in clamping relation, each half of the clamp being provided at one end with a semi-annular groove embracing the flange of the fitting, the opposite end of the two halves each having an inturned flange embracing the pipe at a point remote from the fitting, and a packing interposed between the pipe and fitting and the halves of the clamp, said packing being confined at one end of the clamp by the inturned flange thereon.

2. A repair clamp of the character described adapted to be fitted about a pipe and a flanged fitting attached to the pipe, said clamp consisting of a two-part sleeve fitted about the pipe and enclosing the flange of the fitting, the clamp having an inturned flange at one end engaging an end of the flange on the fitting, the clamp having an inturned flange at the opposite end constituting a gripping means about the pipe, and a packing interposed between the sleeve and the pipe and fitting.

3. A repair clamp of the character described adapted to be fitted around a pipe and a flanged fitting secured thereto, said clamp consisting of a two-part sleeve fitting around the pipe and the flange of the fitting, the sleeve being provided with an opening at one end embracing the pipe, the sleeve being provided with an annular channel at its opposite end embracing the flange on the fitting, the last-mentioned end of the sleeve being provided with an inturned annular flange engaging an end of the flange on the fitting.

4. In a repair clamp of the character described in claim 3, including means for drawing the two parts of the sleeve together to thereby hold the sleeve in place about the pipe and fitting, and a packing disposed within the sleeve between the pipe and flange of the fitting, said packing being confined between the flanges at the opposite ends of the sleeve.

5. A repair clamp for fitment around a pipe and around a flanged fitting secured thereto, a packing extending around the pipe and flange of the fitting, a two-part sleeve fitted over the packing, flanges extending inwardly from the two parts of the sleeve, bolts extending through the flanges for drawing the two parts of the sleeve toward one another to hold the clamp in place about the pipe and flange of the fitting, the parts of the sleeve having a channel adjacent one end to embrace the flange of the fitting, and the parts of the sleeve at the opposite end being shaped so that the same tightly fit about the pipe when the bolts are tightened through the flanges of the sleeve.

6. A repair clamp for a pipe and an attached flanged fitting, said clamp consisting of a sleeve clamping maintained about the pipe and embracing the flange of the fitting and holding the pipe and fitting against longitudinal separation, and a packing interposed between the sleeve and the pipe and flange.

7. A repair clamp as provided for in claim 6, said sleeve consisting of two segments, means for drawing the segments toward one another to clamp the sleeve in position about the pipe and flange of the fitting, said sleeve having an annular channel fitting around the flange of the fitting.

HERMAN J. LISS.